(12) United States Patent
Tao et al.

(10) Patent No.: US 12,155,039 B2
(45) Date of Patent: Nov. 26, 2024

(54) NON-AQUEOUS ELECTROLYTE SECONDARY BATTERY

(71) Applicant: SANYO Electric Co., Ltd., Daito (JP)

(72) Inventors: Yohei Tao, Hyogo (JP); Mio Nosaka, Hyogo (JP); Keisuke Minami, Hyogo (JP); Toyoki Fujihara, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 629 days.

(21) Appl. No.: 17/417,199

(22) PCT Filed: Dec. 19, 2019

(86) PCT No.: PCT/JP2019/049867
§ 371 (c)(1),
(2) Date: Jun. 22, 2021

(87) PCT Pub. No.: WO2020/137817
PCT Pub. Date: Jul. 2, 2020

(65) Prior Publication Data
US 2022/0077499 A1 Mar. 10, 2022

(30) Foreign Application Priority Data
Dec. 28, 2018 (JP) .................. 2018-246590

(51) Int. Cl.
*H01M 10/0569* (2010.01)
*H01M 10/0587* (2010.01)
(Continued)

(52) U.S. Cl.
CPC ... *H01M 10/0569* (2013.01); *H01M 10/0587* (2013.01); *H01M 50/186* (2021.01);
(Continued)

(58) Field of Classification Search
CPC .......... H01M 10/0569; H01M 50/489; H01M 50/186; H01M 50/417; H01M 50/409;
(Continued)

(56) References Cited

U.S. PATENT DOCUMENTS

2008/0241701 A1  10/2008  Okumura et al.
2012/0052385 A1* 3/2012  Minami .................. H01M 4/13
                                                        29/623.5
(Continued)

FOREIGN PATENT DOCUMENTS

CN    101276932 A    10/2008
CN    105845979 A    8/2016
(Continued)

OTHER PUBLICATIONS

KR101588616 MT (Year: 2016).*
(Continued)

*Primary Examiner* — Alexander Usyatinsky
(74) *Attorney, Agent, or Firm* — WHDA, LLP

(57) ABSTRACT

Provided is a non-aqueous electrolyte secondary battery having excellent properties even at low temperatures. The non-aqueous electrolyte secondary battery comprises: an electrode assembly including a positive electrode plate and a negative electrode plate; a non-aqueous electrolyte; an exterior body having an opening, and accommodating the electrode assembly and the non-aqueous electrolyte; and a sealing plate for sealing the opening of the exterior body,
(Continued)

wherein the negative electrode plate has a negative electrode core and a negative electrode active material layer formed on the negative electrode core, and the non-aqueous electrolyte contains a non-aqueous solvent, the non-aqueous solvent containing 50-80 vol % of a chain carbonate with respect to the non-aqueous solvent, and containing, as the chain carbonate, 30-40 vol % of dimethyl carbonate, 3-8 vol % of propylene carbonate, and 2-5 vol % of methyl propionate with respect to the non-aqueous solvent.

6 Claims, 2 Drawing Sheets

(51) Int. Cl.
| | | |
|---|---|---|
| *H01M 50/186* | (2021.01) | |
| *H01M 50/409* | (2021.01) | |
| *H01M 50/417* | (2021.01) | |
| *H01M 50/489* | (2021.01) | |
| *H01M 50/531* | (2021.01) | |

(52) U.S. Cl.
CPC ....... *H01M 50/409* (2021.01); *H01M 50/417* (2021.01); *H01M 50/489* (2021.01); *H01M 50/531* (2021.01); *H01M 2300/0028* (2013.01)

(58) Field of Classification Search
CPC ........... H01M 10/0587; H01M 50/531; H01M 2300/0028
See application file for complete search history.

(56) References Cited

U.S. PATENT DOCUMENTS

| | | |
|---|---|---|
| 2014/0186722 A1 | 7/2014 | Lim et al. |
| 2015/0207147 A1 | 7/2015 | Nagai et al. |
| 2016/0133934 A1* | 5/2016 | Tode ................. H01M 10/0587 429/61 |
| 2016/0226106 A1* | 8/2016 | Minami ............ H01M 10/0587 |

FOREIGN PATENT DOCUMENTS

| | | |
|---|---|---|
| JP | 2004-319212 A | 11/2004 |
| JP | 2009-123671 A | 6/2009 |
| JP | 2012-49061 A | 3/2012 |
| JP | 2013-171758 A | 9/2013 |
| JP | 2016-143454 A | 8/2016 |
| JP | 2016-164879 A | 9/2016 |
| KR | 10-1588616 B1 | 1/2016 |
| KR | 101588616 * | 12/2016 |
| WO | 2016/117399 A1 | 7/2016 |

OTHER PUBLICATIONS

The Decision to grant a Patent issued by JPO (Year: 2023).*
International Search Report dated Mar. 24, 2020, issued in counterpart application No. PCT/JP2019/049867, with English translation. (6 pages).
English Translation of Chinese Search Report dated Feb. 3, 2024, issued in counterpart CN Application No. 201980086274.8. (3 pages).

* cited by examiner

NON-AQUEOUS ELECTROLYTE SECONDARY BATTERY

TECHNICAL FIELD

The present invention relates to a non-aqueous electrolyte secondary battery.

BACKGROUND ART

Non-aqueous electrolyte secondary batteries are used for the drive power source for driving hybrid electric vehicles (PHEV, HEV) and electric vehicles (EV). Non-aqueous electrolyte secondary batteries used for such a drive power source are more required for improvement in performance and reliability.

Non-aqueous electrolyte secondary batteries used for the drive power source are also used in low-temperature environments. Therefore, the non-aqueous electrolyte secondary batteries used for the drive power source are required to have excellent battery characteristics even in low-temperature environments.

For example, Patent Literature 1 below has proposed non-aqueous organic solvents including propylene carbonate and non-aqueous electrolytes including lithium bisfluorosulfonylimide for improving the low temperature output characteristics.

CITATION LIST

Patent Literature

PATENT LITERATURE 1: Japanese Unexamined Patent Application Publication No. 2016-164879

SUMMARY

One of the objectives of the present invention is to provide a non-aqueous electrolyte secondary battery that is excellent in battery characteristics in a low temperature environment.

The non-aqueous electrolyte secondary battery of one embodiment of the present invention comprises:
an electrode assembly including a positive electrode plate and a negative electrode plate;
a non-aqueous electrolyte solution;
an exterior assembly having an opening and accommodating the electrode assembly and the non-aqueous electrolyte solution; and
a sealing plate sealing the opening, wherein
the non-aqueous electrolyte solution includes a non-aqueous solvent,
the non-aqueous solvent includes 50 to 80% by volume of a chain carbonate based on the non-aqueous solvent, and
the non-aqueous solvent includes 30 to 40% by volume of dimethyl carbonate as the chain carbonate, 3 to 8% by volume of propylene carbonate, and 2 to 5% by volume of methyl propionate based on the non-aqueous solvent.

The above configuration allows the non-aqueous electrolyte solution to be less likely to be frozen more effectively by including propylene carbonate and methyl propionate with low freezing points in cyclic carbonate and chain carbonate, respectively. Therefore, the movement of lithium ions in the non-aqueous electrolyte solution is less likely to be hindered in a low temperature environment. This provides the non-aqueous electrolyte secondary battery in which not only low temperature output characteristics are excellent but also Li precipitation is suppressed in a low temperature condition.

The above non-aqueous solvent includes ethylene carbonate, and
the volume ratio of ethylene carbonate in the non-aqueous solvent is preferably larger than the volume ratio of propylene carbonate in the non-aqueous solvent. This provides the non-aqueous electrolyte secondary battery that is superior in low temperature output characteristics.

The above negative electrode plate has a negative electrode core body, and a negative electrode active material layer formed on the negative electrode core body,
wherein the negative electrode active material layer includes at least one of carboxymethyl cellulose and a salt of carboxymethyl cellulose, and the proportion of the total mass of the carboxymethyl cellulose and the salt of carboxymethyl cellulose based on the total mass of the negative electrode active material layer is preferably 0.5 to 0.7% by mass. This provides the non-aqueous electrolyte secondary battery in which not only low temperature output characteristics are superior but also Li precipitation is suppressed more effectively in a low temperature condition.

The above electrode assembly is a flat wound electrode assembly, and the configuration is preferably such that an exposed portion of the wound positive electrode core body is provided at one end of the flat wound electrode assembly, and an exposed portion of the wound negative electrode core body is provided at the other end of the flat wound electrode assembly. This provides the non-aqueous electrolyte secondary battery that is superior in low temperature output characteristics.

Preferably, a separator having a polyolefin layer is placed between the positive electrode plate and the negative electrode plate, the surface of the negative electrode active material layer is in direct contact with the polyolefin layer, and the separator has a thickness of 15 to 20 μm. This provides the non-aqueous electrolyte secondary battery in which not only low temperature output characteristics are superior but also Li precipitation is suppressed more effectively in a low temperature condition.

The above non-aqueous electrolyte solution preferably includes lithium fluorosulfonate.

Advantageous Effects of Invention

The present invention provides the non-aqueous electrolyte secondary battery in which low temperature output characteristics are excellent and Li precipitation is suppressed in a low temperature condition.

BRIEF DESCRIPTION OF DRAWINGS

FIG. 3 (*b*) is a sectional view along the IIIB-IIIB line in (a).

FIG. 4 (*b*) is a sectional view along the IVB-IVB line in (a).

DESCRIPTION OF EMBODIMENTS

Hereinafter, the embodiment of the present invention will be described in detail. However, the embodiment shown below is an example of the present invention, and the present invention is not limited to this embodiment.

Figure 1:
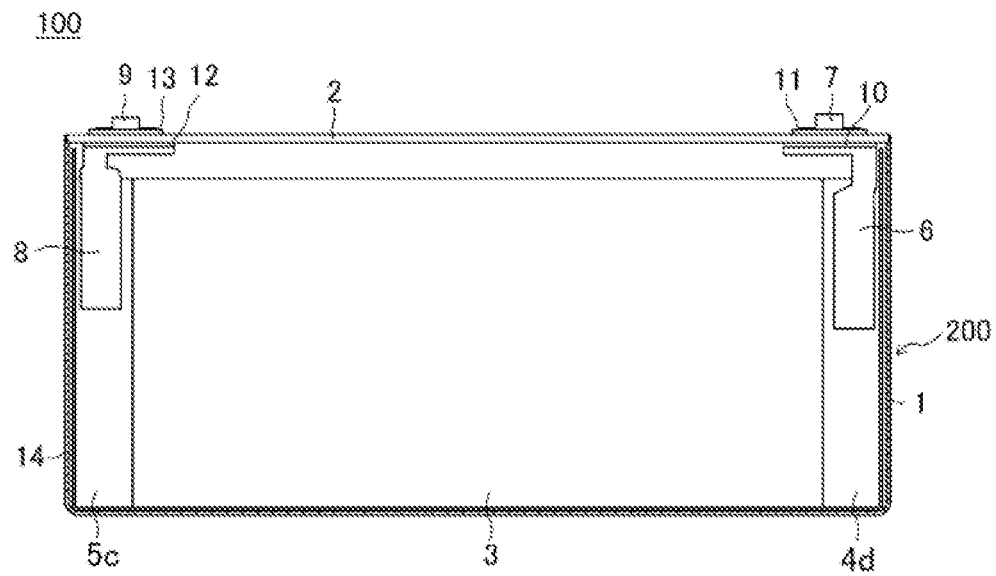
FIG. 1 is a schematic front view showing the inside of the battery, without the front portion of the battery case and the front portion of the insulating sheet of the non-aqueous electrolyte secondary battery according to the embodiment.
Figure 2:
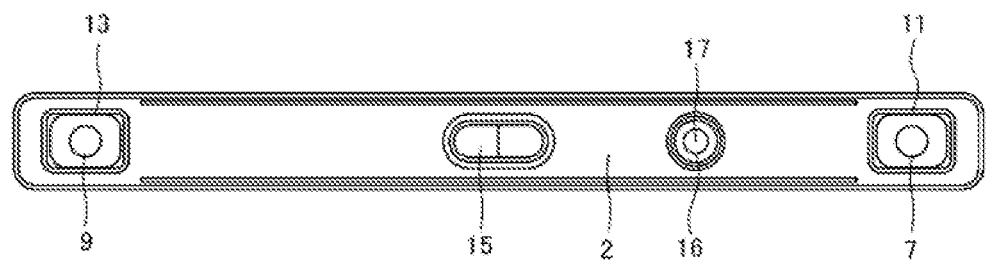
FIG. 2 is a top view of the non-aqueous electrolyte secondary battery according to the embodiment.

FIG. 1 and FIG. 2 are used to describe the configuration of rectangular non-aqueous electrolyte secondary battery 100 according to the embodiment. As shown in FIG. 1 and FIG. 2, the rectangular non-aqueous electrolyte secondary battery 100 according to the embodiment has a rectangular bottom-shaped cylindrical exterior assembly 1 with an opening and a sealing plate 2 sealing the opening of the exterior assembly 1. A battery case 200 is composed of the exterior assembly 1 and the sealing plate 2. The exterior assembly 1 accommodates a non-aqueous electrolyte and the flat wound electrode assembly 3 in which a band-shaped positive electrode plate 4 and a band-shaped negative electrode plate 5 are wound with a separator (not shown) therebetween. The wound electrode assembly 3 has an exposed portion of the wound positive electrode core body 4d at one end, and has an exposed portion of the wound negative electrode core body 5c at the other end.

The positive electrode current collector 6 is connected to the exposed portion of the positive electrode core body 4d, and the positive electrode current collector 6 and a positive electrode terminal 7 are connected electrically. An inner insulating member 10 is placed between the positive electrode current collector 6 and the sealing plate 2, and the outer insulating member 11 is placed between the positive electrode terminal 7 and the sealing plate 2.

The negative electrode current collector 8 is connected to the exposed portion of the negative electrode core body 5c, and the negative electrode current collector 8 and the negative electrode terminal 9 are connected electrically. An inner insulating member 12 is placed between the negative electrode current collector 8 and the sealing plate 2, and an outer insulating member 13 is placed between the negative electrode terminal 9 and the sealing plate 2.

A resin insulating sheet 14 is placed between a wound electrode assembly 3 and the exterior assembly 1. In the sealing plate 2, provided is a gas exhaust valve 15 that breaks when the pressure in the battery case 200 is the specified value or more to exhaust gas in the battery case 200 to outside of the battery case 200. In addition, a non-aqueous electrolyte solution injection hole 16 is formed in the sealing plate 2. This non-aqueous electrolyte solution injection hole 16 is sealed by a sealing member 17 after a non-aqueous electrolyte solution is injected into the battery case 200.

Hereinafter, a method for producing a non-aqueous electrolyte secondary battery 100 will be described.

[Production of Positive Electrode Plate]

The lithium transition metal composite oxide represented by $LiNi_{0.35}Co_{0.35}Mn_{0.30}O_2$ as a positive electrode active material, carbon powder as a conductive agent, and polyvinylidene fluoride (PVdF) as a binding agent are mixed with N-methyl-2-pyrrolidone (NMP) as a dispersion medium to produce a positive electrode mixture slurry. Herein, the mass ratio of the positive electrode active material, conductive agent, and binding agent included in the positive electrode mixture slurry is 91:7:2.

The positive electrode mixture slurry produced in the above method is applied onto both sides of an aluminum foil having a thickness of 15 μm as a positive electrode core body by using a die-coater. Thereafter, the positive electrode mixture slurry is dried to remove NMP as a dispersion medium. A positive electrode active material layer is compressed by using a pair of compression rollers. At this time, compression treatment is performed so that the packing density of the positive electrode active material layer after compression is 2.4 g/cm$^3$. Then, this is cut to a predetermined size to form the exposed portion of the positive electrode core body in which no positive electrode active material layer is formed on both sides along the longitudinal direction of one end in the width direction of the positive electrode plate, and thus the positive electrode plate is provided.

Figure 3A:
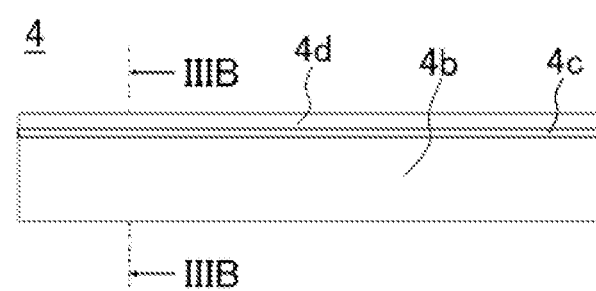
FIG. 3 (*a*) is a plan view of the positive electrode plate according to the embodiment.
Figure 3B:
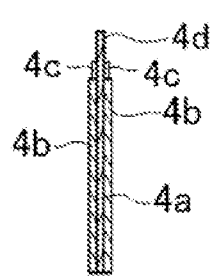

As shown in FIGS. 3(a) and (b), a positive electrode active material layer 4b including the positive electrode active material is formed on both sides of a positive electrode core body 4a. At one end in the width direction of the positive electrode plate 4, provided is an exposed portion of a positive electrode core body 4d in which no positive electrode active material layer 4b is formed on both sides of the positive electrode core body 4a. As shown in FIGS. 3 (a) and (b), a positive electrode protective layer 4c can be provided in the vicinity of the end in the width direction of the positive electrode active material layer 4b in the positive electrode core body 4a. The positive electrode protective layer 4c preferably includes ceramic particles and a binder.

[Production of Negative Electrode Plate]

Graphite powder as a negative electrode active material, carboxymethylcellulose (CMC) as a thickening material, and styrene-butadiene rubber (SBR) as a binding agent are dispersed in water at a mass ratio of 98.8:1.0:0.2 to produce a negative electrode mixture slurry.

The negative electrode mixture slurry produced in the above method is applied onto both sides of a copper foil having a thickness of 8 μm as a negative electrode core body by using a die-coater. Then, the negative electrode mixture slurry is dried to remove water as a dispersion medium, and the negative electrode active material layer is compressed to a predetermined thickness by a roll press. Then, this is cut to a predetermined size to form the exposed portion of the negative electrode core body in which no negative electrode active material layer is formed on both sides along the longitudinal direction of one end in the width direction of the negative electrode plate, and thus the negative electrode plate is provided.

Figure 4A:
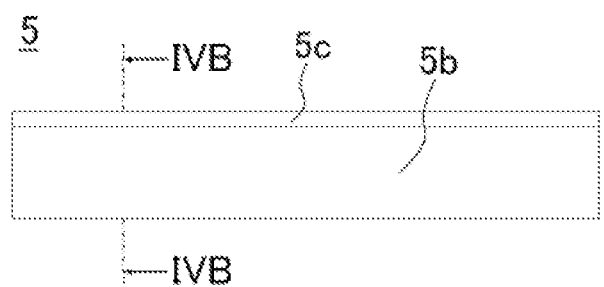
FIG. 4 (*a*) is a plan view of the negative electrode plate according to the embodiment.
Figure 4B:
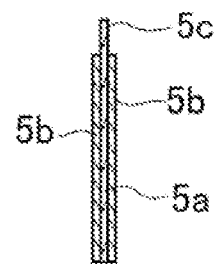

As shown in FIGS. 4(a) and (b), a negative electrode active material layer 5b including the negative electrode active material is formed on both sides of a negative electrode core body 5a. At one end in the width direction of the negative electrode plate 5, provided is an exposed portion of a negative electrode core body 5c in which no negative electrode active material layer 5b is formed on both sides of the negative electrode core body 5a.

[Production of Flat Wound Electrode Assembly]

The band-shaped positive electrode plate and band-shaped negative electrode plate produced in the above method are wound through a band-shaped separator with a three-layer of polypropylene/polyethylene/polypropylene and a thickness of 16 μm, and are subjected to press molding to a flat shape to produce a flat wound electrode assembly 3. Then, the exposed portion of the wound positive electrode core body 4d is formed at one end in the winding axis direction of the flat wound electrode assembly 3, and the exposed portion of the negative electrode core body 5c is formed at the other end.

[Adjustment of Non-aqueous Electrolyte Solution]

Ethylene carbonate (EC), ethyl methyl carbonate (EMC), dimethyl carbonate (DMC), propylene carbonate (PC), and methyl propionate (PM) are mixed in a volume ratio (25° C., 1 atm) at 20:37:35:5:3 to produce a non-aqueous solvent.

Into this non-aqueous solvent, $LiPF_6$ as a solute is added so as to be 1.15 mol/L, and 1.0% by mass of lithium fluorosulfonate based on the non-aqueous electrolyte solution is further added to provide a non-aqueous electrolyte solution.

[Mounting Terminal and Current Collector to Sealing Plate]

The outer insulating member 11 is placed on the battery outer side of a positive electrode terminal mounting hole of the sealing plate 2. The inner insulating member 10 and the positive electrode current collector 6 are placed on the battery inner side of a positive electrode terminal mounting hole of the sealing plate 2. Thereafter, from the battery outer side, the positive electrode terminal 7 is inserted into the through hole of the outer insulating member 11, the positive electrode terminal mounting hole of the sealing plate 2, the through hole of the inner insulating member 10, and the through hole of the positive electrode current collector 6. The tip side of the positive electrode terminal 7 is crimped onto the positive electrode current collector 6. Thereafter, the crimped portion of the positive electrode terminal 7 and the positive electrode current collector 6 are welded and connected.

The outer insulating member 13 is placed on the battery outer side of a negative electrode terminal mounting hole of the sealing plate 2. The inner insulating member 12 and the negative electrode current collector 8 are placed on the battery inner side of a negative electrode terminal mounting hole of the sealing plate 2. Thereafter, from the battery outer side, the negative electrode terminal 9 is inserted into the through hole of the outer insulating member 13, the negative electrode terminal mounting hole of the sealing plate 2, the through hole of the inner insulating member 12, and the through hole of the negative electrode current collector 8. The tip side of the negative electrode terminal 9 is crimped onto the negative electrode current collector 8. Thereafter, the crimped portion of the negative electrode terminal 9 and the negative electrode current collector 8 are welded and connected.

[Connection Between Current Collector and Wound Electrode Assembly]

The positive electrode current collector 6 is welded and connected to the exposed portion of the positive electrode core body 4d in which the wound electrode assembly 3 is wound. In addition, the negative electrode current collector 8 is welded and connected to the exposed portion of the negative electrode core body 5c in which the wound electrode assembly 3 is wound. Welded connection can be performed by using, for example, resistance welding, ultrasonic welding, and laser welding.

[Insertion of Electrode Assembly into Exterior Assembly]

The wound electrode assembly 3 is wrapped with the resin insulating sheet 14, and the wound electrode assembly 3 is inserted into the exterior assembly 1. Thereafter, the exterior assembly 1 and the sealing plate 2 are welded together, and the opening of the exterior assembly 1 is sealed with the sealing plate 2.

[Injection and Sealing of Non-Aqueous Electrolyte Solution]

The non-aqueous electrolyte solution produced in the above method is injected from the non-aqueous electrolyte solution injection hole 16 provided in the sealing plate 2, and the non-aqueous electrolyte solution injection hole 16 is sealed with a blind rivet as the sealing member 17. As described above, a non-aqueous electrolyte secondary battery 100 is produced.

Example 1

The non-aqueous electrolyte secondary battery 100 was produced by the above method to provide the non-aqueous electrolyte secondary battery according to Example 1.

Example 2

Ethylene carbonate (EC), ethyl methyl carbonate (EMC), dimethyl carbonate (DMC), propylene carbonate (PC), and methyl propionate (PM) were mixed in a volume ratio (25° C., 1 atm) at 20:35:35:5:5 to produce a non-aqueous solvent. Into this non-aqueous solvent, $LiPF_6$ as a solute was added so as to be 1.15 mol/L, and 1.0% by mass of lithium fluorosulfonate based on the non-aqueous electrolyte solution was further added to provide the non-aqueous electrolyte solution according to Example 2.

The non-aqueous electrolyte solution according to Example 2 as a non-aqueous electrolyte solution was used to produce the non-aqueous electrolyte secondary battery in the same manner as in Example 1 to provide the non-aqueous electrolyte secondary battery according to Example 2.

Comparative Example 1

Ethylene carbonate (EC), ethyl methyl carbonate (EMC), dimethyl carbonate (DMC), and methyl propionate (PM) were mixed in a volume ratio (25° C., 1 atm) at 25:37:35:3 to produce a non-aqueous solvent. Into this non-aqueous solvent, $LiPF_6$ as a solute was added so as to be 1.15 mol/L, and 1.0% by mass of lithium fluorosulfonate based on the non-aqueous electrolyte solution was further added to provide the non-aqueous electrolyte solution according to Comparative Example 1.

The non-aqueous electrolyte solution according to Comparative Example 1 as a non-aqueous electrolyte solution was used to produce the non-aqueous electrolyte secondary battery in the same manner as in Example 1 to provide the non-aqueous electrolyte secondary battery according to Comparative Example 1.

Comparative Example 2

Ethylene carbonate (EC), ethyl methyl carbonate (EMC), and dimethyl carbonate (DMC) were mixed in a volume ratio (25° C., 1 atm) at 30:30:40 to produce a non-aqueous solvent. Into this non-aqueous solvent, $LiPF_6$ as a solute was added so as to be 1.15 mol/L, and 1.0% by mass of lithium fluorosulfonate based on the non-aqueous electrolyte solution was further added to provide the non-aqueous electrolyte solution according to Comparative Example 2.

The non-aqueous electrolyte solution according to Comparative Example 2 as a non-aqueous electrolyte solution was used to produce the non-aqueous electrolyte secondary battery in the same manner as in Example 1 to provide the non-aqueous electrolyte secondary battery according to Comparative Example 2.

Comparative Example 3

Ethylene carbonate (EC), ethyl methyl carbonate (EMC), dimethyl carbonate (DMC), propylene carbonate (PC), and methyl propionate (PM) were mixed in a volume ratio (25° C., 1 atm) at 15:37:35:10:3 to produce a non-aqueous solvent. Into this non-aqueous solvent, $LiPF_6$ as a solute was added so as to be 1.15 mol/L, and 1.0% by mass of lithium fluorosulfonate based on the non-aqueous electrolyte solution was further added to provide the non-aqueous electrolyte solution according to Comparative Example 3.

The non-aqueous electrolyte solution according to Comparative Example 3 as a non-aqueous electrolyte solution was used to produce the non-aqueous electrolyte secondary battery in the same manner as in Example 1 to provide the non-aqueous electrolyte secondary battery according to Comparative Example 3.

The following initial treatment was performed on the non-aqueous electrolyte secondary batteries of Examples 1 and 2 and Comparative Examples 1 to 3.

[Initial Treatment]
(1) Constant current charging was performed to a battery voltage of 3.75 V with a current of 35 A under the condition of 25° C., and then constant voltage charging was performed to a current value of 1 A.
(2) Aging was performed at 75° C. for 22 hours.
(3) Constant current charging was performed to a battery voltage of 4.1 V with a current of 35 A under the condition of 25° C., and then constant voltage charging was performed to a current value of 0.25 A.
(4) Constant current charging was performed to a battery voltage of 1.6 V with a current of 35 A under the condition of 25° C., and then constant voltage charging was performed to a current value of 0.25 A.
(5) Constant current charging was performed to a battery voltage of 3.14 V with a current of 35 A under the condition of 25° C., and then constant voltage charging was performed to a current value of 0.25 A.
(6) Aging was performed at 75° C. for 22 hours.

For the non-aqueous electrolyte secondary batteries of Examples 1 and 2 and Comparative Examples 1 to 3 that were subjected to the above initial treatment, low temperature output characteristics were measured and the limit current value of Li precipitation at low temperature (Li precipitation resistance at low temperature) was measured.

<Measurement of Low Temperature Output Characteristics>

A non-aqueous electrolyte secondary battery was charged to a charging depth (SOC) of 27% with a charging current of 4.0 A at 25° C. Then, the non-aqueous electrolyte secondary battery was left to stand in a condition of −35° C. for 5 hours. Thereafter, discharge was performed for 10 seconds with currents of 12A, 24A, 36A, 48A, 60A, and 72A, and the respective battery voltages were measured. The output was calculated from the I-V characteristics in discharging by plotting each of the current values and the battery voltages, and the low temperature output characteristics were thus obtained. The charging depth deviated by the discharge was returned to the original charging depth by charging with a constant current of 0.4 A.

<Measurement of Limit Current Value of Li Precipitation at Low Temperature>

A non-aqueous electrolyte secondary battery was charged to a charging depth (SOC) of 79% with a charging current of 4.0 A at 25° C. Then, the non-aqueous electrolyte secondary battery was left to stand in a condition of −10° C. for 5 hours. Thereafter, charge-and-discharge cycles were repeated for 1000 cycles by sandwiching a pause time of 600 seconds therebetween, with a predetermined energization current, an energization time of 5 seconds, and a pause time of 600 seconds (that is, 10 minutes). After 1000 cycles were completed, discharge was performed to a charging depth (SOC) of 0% with a charging current of 4.0 A at 25° C., the non-aqueous electrolyte secondary battery was disassembled, and the presence or absence of Li metal precipitation on the negative electrode plate was checked.

For each of the non-aqueous electrolyte secondary batteries, the above charge-and-discharge cycle test was performed under different conditions of energization current, and the maximum energization current at which no Li metal precipitation was observed on the negative electrode plate after the charge-and-discharge cycle was defined as the limit current value of Li precipitation at low temperature. The energization current was set to different conditions in increments of 5 A.

Measurement result of low temperature output characteristics and measurement result of the limit current value of Li precipitation at low temperature are shown in Table 1.

TABLE 1

|  | EC (% by volume) | EMC (% by volume) | DMC (% by volume) | PC (% by volume) | MP (% by volume) | $FSO_3Li$ (% by mass) | Low temperature output characteristics (W) | Limit current value of Li precipitation at low temperature (A) |
|---|---|---|---|---|---|---|---|---|
| Example 1 | 20 | 37 | 35 | 5 | 3 | 1 | 234 | 160 |
| Example 2 | 20 | 35 | 35 | 5 | 5 | 1 | 245 | 165 |
| Comparative Example 1 | 25 | 37 | 35 | 0 | 3 | 1 | 220 | 155 |
| Comparative Example 2 | 30 | 30 | 40 | 0 | 0 | 1 | 216 | 120 |
| Comparative Example 3 | 15 | 37 | 35 | 10 | 3 | 1 | 193 | 146 |

As in Examples 1 and 2, the non-aqueous solvent includes 50 to 80% by volume of a chain carbonate, includes 30 to 40% by volume of dimethyl carbonate as the chain carbonate, includes 3 to 8% by volume of propylene carbonate, and includes 2 to 5% by volume of methyl propionate, thereby providing the non-aqueous electrolyte secondary battery in which low temperature output characteristics are excellent and Li precipitation is suppressed in a low temperature condition. This can be considered as follows. It is possible to make the non-aqueous electrolyte solution less likely to be frozen more effectively by including propylene carbonate and methyl propionate with low freezing points in cyclic carbonate and chain carbonate, respectively. Therefore, the movement of lithium ions in the non-aqueous electrolyte solution is less likely to be hindered in a low temperature environment. This provides the non-aqueous electrolyte secondary battery in which not only low temperature output characteristics are excellent but also Li precipitation is suppressed in a low temperature condition.

As in Comparative Example 1, when no propylene carbonate is included in the non-aqueous solvent, the cyclic carbonate has higher freezing point and thus becomes easily frozen, and therefore the low temperature output characteristics are low and Li easily precipitates in a low temperature condition.

As in Comparative Example 2, when none of propylene carbonate and methyl propionate is included in the non-aqueous solvent, the chain carbonate has higher freezing point and thus becomes easily frozen as in Comparative Example 1, and therefore the low temperature output characteristics are low and Li easily precipitates in a low temperature condition.

As in Comparative Example 3, when the amount of propylene carbonate included in the non-aqueous solvent is more than 8% by volume and lithium ions solvated with a solvent including the propylene carbonate are inserted between layers of a carbon material as a negative electrode active material, the lithium ions are not desolvated and inserted with the solvent in the negative electrode solid electrointerface (SEI) coating and then the carbon material as the negative electrode active material is peeled off, and therefore the low temperature output characteristics are low and Li easily precipitates in a low temperature condition.

The non-aqueous electrolyte solution preferably includes lithium fluorosulfonate. When this lithium fluorosulfonate is present on the surface of the positive electrode active material, the formation of an insulating layer (for example, NiO) is suppressed due to oxygen deficiency at the interface of the positive electrode active material, thus reducing the resistance and improving the output. The amount of lithium fluorosulfonate in the non-aqueous electrolyte solution is preferably 0.01 to 2.0% by mass based on the non-aqueous electrolyte solution.

In addition, the non-aqueous solvent preferably includes ethylene carbonate. The volume ratio of ethylene carbonate in the non-aqueous solvent preferably is larger than the volume ratio of propylene carbonate. As a result, lithium ions maintain to move easily without significantly decreasing the dielectric constant in the non-aqueous electrolyte solution. The amount of ethylene carbonate included in the non-aqueous solvent is preferably 15 to 40% by volume based on the non-aqueous solvent.

The negative electrode active material layer includes at least one of carboxymethyl cellulose and a salt of carboxymethyl cellulose, and the proportion of the total mass of the carboxymethyl cellulose and the salt of carboxymethyl cellulose based on the total mass of the negative electrode active material layer is preferably 0.5 to 0.7% by mass. Within such a range, the amount of carboxymethyl cellulose and the salt of carboxymethyl cellulose, through which lithium ions are less likely to permeate, coating the surface of the negative electrode active material is optimized, and thus lithium precipitation is less likely to occur in a low temperature environment.

<Other Components>

The lithium transition metal composite oxide is preferable as a positive electrode active material. Examples of the lithium transition metal composite oxide include lithium cobalt oxide ($LiCoO_2$), lithium manganate ($LiMn_2O_4$), lithium nickel oxide ($LiNiO_2$), lithium nickel manganese composite oxide ($LiNi_{1-x}Mn_xO_2$ ($0<x<1$)), lithium nickel cobalt composite oxide ($LiNi_{1-x}Co_xO_2$ ($0<x<1$)), and lithium nickel cobalt manganese composite oxide ($LiNi_xCo_yMn_zO_2$ ($0<x<1$, $0<y<1$, $0<z<1$, $x+y+z=1$)).

In addition, those obtained by adding, for example, Al, Ti, Zr, Nb, B, W, Mg, or Mo to the above lithium transition metal composite oxide can be used. Examples thereof include the lithium transition metal composite oxide represented by at least $Li_{1+a}Ni_xCo_yMn_zM_bO_2$ (M is at least one element selected from Al, Ti, Zr, Nb, B, Mg and Mo, $0 \leq a \leq 0.2$, $0.2 \leq x \leq 0.5$, $0.2 \leq y \leq 0.5$, $0.2 \leq z \leq 0.4$, $0 \leq b \leq 0.02$, and $a+b+x+y+z=1$).

The carbon material capable of absorbing and desorbing lithium ions can be used as a negative electrode active material. Examples of the carbon material capable of absorbing and desorbing lithium ions include graphite, hardly graphitizable carbon, easily graphitizable carbon, fibrous carbon, coke, and carbon black. Of these, graphite is particularly preferable. Moreover, examples of the non-carbon material include silicon, tin, and alloys or oxides mainly including them.

For example, carbonates, lactones, ethers, ketones, and esters can be used as a non-aqueous solvent (organic solvent) of the non-aqueous electrolyte solution, and two or more of these solvents can be used in admixture. For example, cyclic carbonates such as ethylene carbonate, propylene carbonate, and butylene carbonate; and chain carbonates such as dimethyl carbonate, ethyl methyl carbonate, and diethyl carbonate can be used. Particularly, a mixed solvent of cyclic carbonate and chain carbonate is preferably used. In addition, unsaturated cyclic carbonates such as vinylene carbonate (VC) can be added to a non-aqueous electrolyte.

The non-aqueous electrolyte solution preferably includes lithium fluorosulfonate ($LiFSO_3$). In addition, the non-aqueous electrolyte more preferably includes lithium bisoxalate borate ($LiC_4BO_8$), lithium difluorophosphate ($LiPF_2O_2$), and lithium fluorosulfonate ($LiFSO_3$).

Those generally used as the electrolyte salt in the conventional lithium ion secondary battery can be used as the electrolyte salt of a non-aqueous electrolyte solution. For example, $LiPF_6$, $LiBF_4$, $LiCF_3SO_3$, $LiN(CF_3SO_2)_2$, $LiN(C_2F_5SO_2)_2$, $LiN(CF_3SO_2)(C+F_9SO_2)$, $LiC(CF_3SO_2)_3$, $LiC(C_2FsSO_2)_3$, $LiAsF_6$, $LiClO_4$, $Li_2B_{10}Cl_{10}$, $Li_2B_{12}Cl_{12}$, $LiB(C_2O_4)_2$, $LiB(C_2O_4)F_2$, $LiP(C_2O_4)_3$, $LiP(C_2O_4)_2F_2$, $LiP(C_2O_4)F_4$, and a mixture thereof are used. Of these, $LiPF_6$ is particularly preferable. The amount of the electrolyte salt dissolved in the above non-aqueous solvent is preferably 0.5 to 2.0 mol/L.

A porous separator made of polyolefins such as polypropylene (PP) or polyethylene (PE) is preferably used as a separator. Particularly, the separator having a three-layer structure with polypropylene (PP) and polyethylene (PE) (PP/PE/PP or PE/PP/PE) is preferably used. In addition, the separator can be provided with a heat resistant layer consisting of inorganic particles such as alumina and a binder. In addition, a polymer electrolyte may be used as a separator.

REFERENCE SIGNS LIST

100 Non-aqueous electrolyte secondary battery
200 Battery case
1 Exterior assembly
2 Sealing plate
3 Wound electrode assembly
4 Positive electrode plate
4a Positive electrode core body
4b Positive electrode active material layer
4c Positive electrode protective layer
4d Exposed portion of positive electrode core body
5 Negative electrode plate
5a Negative electrode core body
5b Negative electrode active material layer 5c Exposed portion of negative electrode core body
6 Positive electrode current collector
7 Positive electrode terminal
8 Negative electrode current collector
9 Negative electrode terminal
10 Inner insulating member
11 Outer insulating member
12 Inner insulating member
13 Outer insulating member
14 Insulating sheet
15 Gas exhaust valve
16 Non-aqueous electrolyte solution injection hole
17 Sealing member

The invention claimed is:

1. A non-aqueous electrolyte secondary battery, comprising:
    an electrode assembly including a positive electrode plate and a negative electrode plate;
    a non-aqueous electrolyte solution;
    an exterior assembly having an opening and accommodating the electrode assembly and the non-aqueous electrolyte solution; and
    a sealing plate sealing the opening, wherein
    the non-aqueous electrolyte solution includes a non-aqueous solvent,
    the non-aqueous solvent includes 50% to 80% by volume of a chain carbonate based on the non-aqueous solvent,
    the non-aqueous solvent includes 30% to 40% by volume of dimethyl carbonate as the chain carbonate, 3% to 8% by volume of propylene carbonate, and 2% to 5% by volume of methyl propionate based on the non-aqueous solvent,
    the negative electrode plate has a negative electrode core body, and a negative electrode active material layer formed on the negative electrode core body,
    a separator having a polyolefin layer is placed between the positive electrode plate and the negative electrode plate, and
    a surface of the negative electrode active material layer is in direct contact with the polyolefin layer.

2. The non-aqueous electrolyte secondary battery according to claim 1,
    wherein the non-aqueous solvent includes ethylene carbonate, and
    a volume ratio of ethylene carbonate in the non-aqueous solvent is larger than a volume ratio of propylene carbonate in the non-aqueous solvent.

3. The non-aqueous electrolyte secondary battery according to claim 1,
    wherein
    the negative electrode active material layer includes at least one of carboxymethyl cellulose and a salt of carboxymethyl cellulose, and
    a proportion of a total mass of the carboxymethyl cellulose and the salt of carboxymethyl cellulose based on a total mass of the negative electrode active material layer is 0.5% to 0.7% by mass.

4. The non-aqueous electrolyte secondary battery according to claim 1,
    wherein the electrode assembly is a flat wound electrode assembly,
    an exposed portion of a wound positive electrode core body is provided at one end of the flat wound electrode assembly, and
    an exposed portion of a wound negative electrode core body is provided at the other end of the flat wound electrode assembly.

5. The non-aqueous electrolyte secondary battery according to claim 1,
    wherein
    the separator has a thickness of 15 μm to 20 μm.

6. The non-aqueous electrolyte secondary battery according to claim 1,
    wherein the non-aqueous electrolyte solution includes lithium fluorosulfonate.

* * * * *